United States Patent [19]
Cahoon, Jr. et al.

[11] 3,847,535

[45] Nov. 12, 1974

[54] METHOD AND APPARATUS FOR EXTRUDING CERAMIC TUBES

[75] Inventors: John B. Cahoon, Jr., Livermore; John B. Currey, Castro Valley; Donald L. Emig, Livermore, all of Calif.

[73] Assignee: The United States of America as represented by the United Atomic Energy Commission, Washington, D.C.

[22] Filed: July 6, 1960

[21] Appl. No.: 41,218

[52] U.S. Cl. ................ 425/291, 425/309, 425/317, 252/301.1 R
[51] Int. Cl. ........................................... A21c 11/10
[58] Field of Search ............ 18/12 A, 47.5 G, 14 G, 18/25, 14 C, 55 V; 49/48; 34/216, 208; 25/11, 17 B, 17 C, 17 D, 105, 112; 146/78; 425/291, 309, 317

[56] References Cited
UNITED STATES PATENTS

| | | | |
|---|---|---|---|
| 2,377,668 | 6/1945 | Bole et al. | 25/107 |
| 2,641,042 | 6/1953 | Koff | 25/107 |
| 1,932,124 | 10/1933 | Tobey | 34/217 |
| 2,686,665 | 8/1954 | Tauber et al. | 263/40 |
| 2,913,239 | 11/1959 | Greene | 263/40 |
| 2,761,177 | 9/1956 | Walters | 18/47.5 G |
| 2,531,739 | 11/1950 | Orsini | 264/141 |
| 2,614,290 | 10/1952 | Street | 18/12 A |
| 2,862,278 | 12/1958 | Engle et al. | 252/442 |
| 1,340,225 | 5/1920 | Howard | 148/78 |

FOREIGN PATENTS OR APPLICATIONS

| | | | |
|---|---|---|---|
| 1,228,945 | 9/1960 | France | 18/2 J |

OTHER PUBLICATIONS
2d. Geneva Conference on Atomic Energy, Vol. 5, pp. 370-374, Sept. 1958.

*Primary Examiner*—Stephen J. Lechert, Jr.
*Attorney, Agent, or Firm*—John A. Horan; Frederick A. Robertson; James M. Hanley

EXEMPLARY CLAIM
1. In an apparatus for cutting the walls of extruded tubing material to a variable depth as it emerges from an extruder, the combination comprising an extruder diaphragm and die, a mandrel extending outwardly from said die, a cutter body defining an aperture mounted over said die and around said mandrel extending from said die, a plurality of cutter blades adjustably mounted in spaced relation around said mandrel on said body for simultaneous inward movement transverse to the axis of said mandrel and to a position to close tolerance therewith in a single transverse plane, means adapted to move said blades inwardly and means for returning said blades to their initial starting positions. 12. In a method for forming cuts on the exterior surfaces of an extruded ceramic tube, the steps comprising extruding a ceramic tube from an extruder assembly including an extruder diaphragm, die, and extruder mandrel extending exteriorly from said die, rapidly moving a plurality of blades inwardly in simultaneous movement at given intervals in a plane transverse to the direction of extrusion to an adjustable position in close tolerance with the extending end of said mandrel, said blades being initially mounted in spaced relation radially around said extrusion mandrel, said blades being adapted to intercept the surface of said ceramic tube substantially in a single plane transverse to the direction of extrusion, whereby a score completely circumscribing said tube in a single plane is formed, and returning said blades are the conclusion of the inward stroke to its initial position after a swell time coordinated with said extrusion speed, said entire movement and return being adjusted to a period of time rapid enough to form a substantially continuous cut without a notching effect. 16. In the extrusion of moist elongated ceramic members and the subsequent substantial drying of same to rigid brittleness, an improved method for severing the elongated ceramic members into exact lengths and exact dimensional tolerances comprising the steps of forming the moist extrudable ceramic mix rigid enough to hold its shape when extruded yet plastic enough to flow slightly into depressions when extruded, extruding moist, elongated ceramic member from said material, circumferentially scoring the surface of the moist extruded member at at least one station therealong at which severance is desired, effecting said substantial drying of the extruded member, and applying a bending stress upon the dried member at said scored station thereby breaking the member proximate the scored station into separate lengths.

23 Claims, 22 Drawing Figures

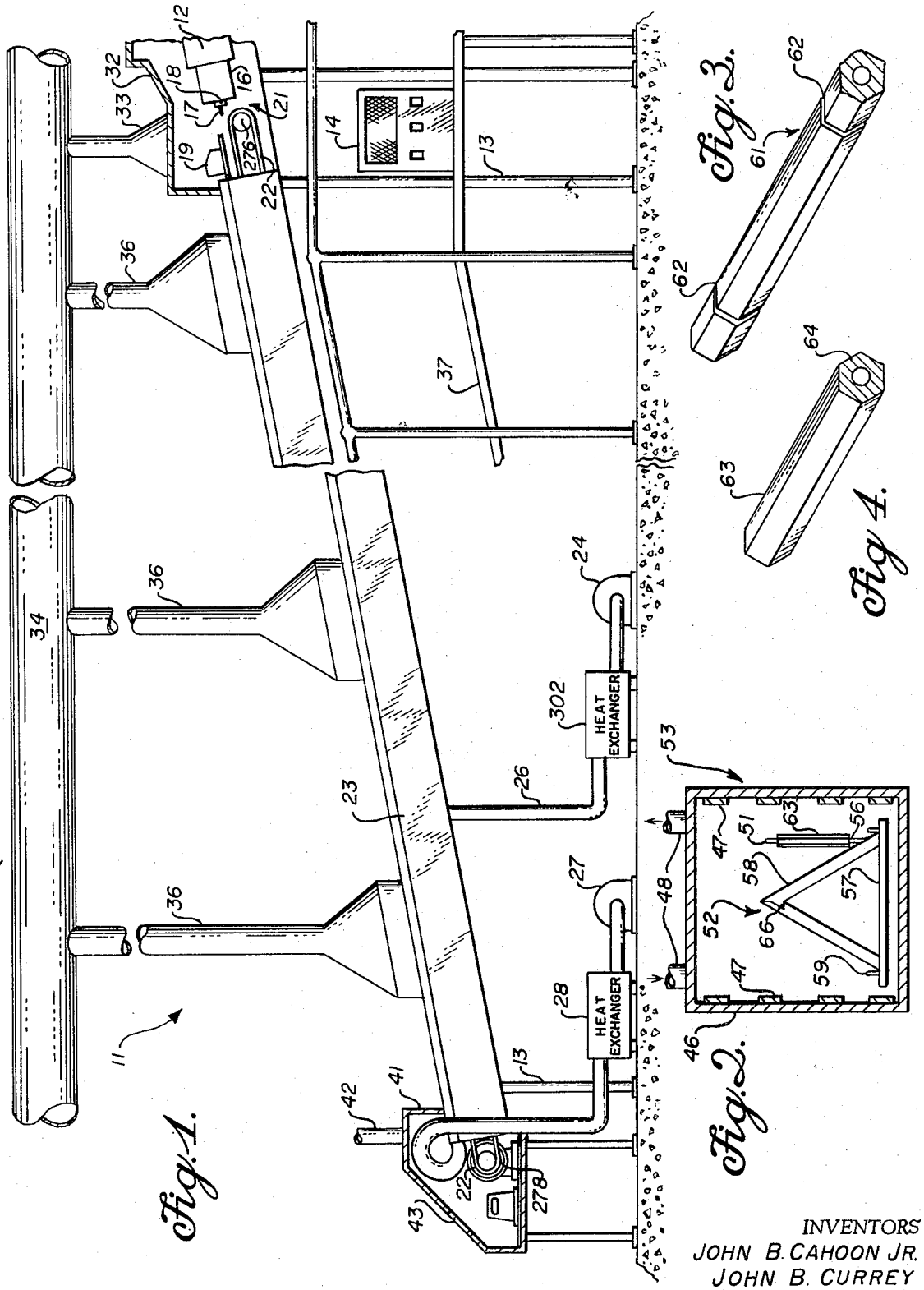

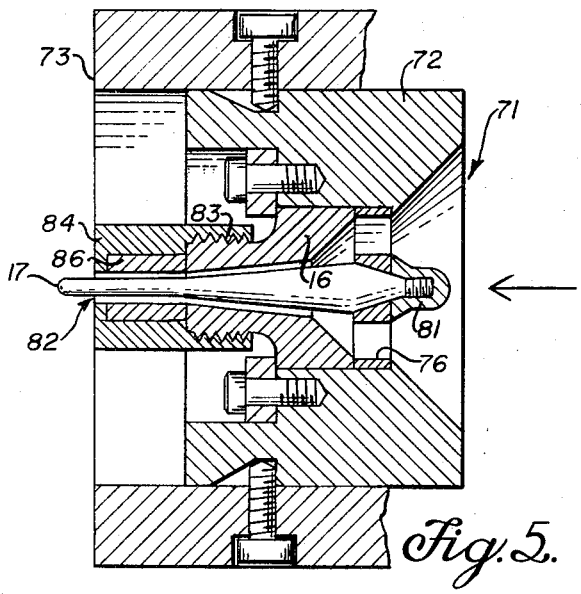
Fig.5.
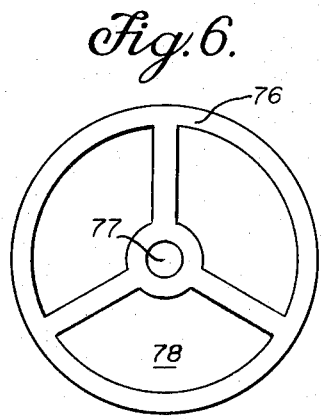
Fig.6.
Fig.7.
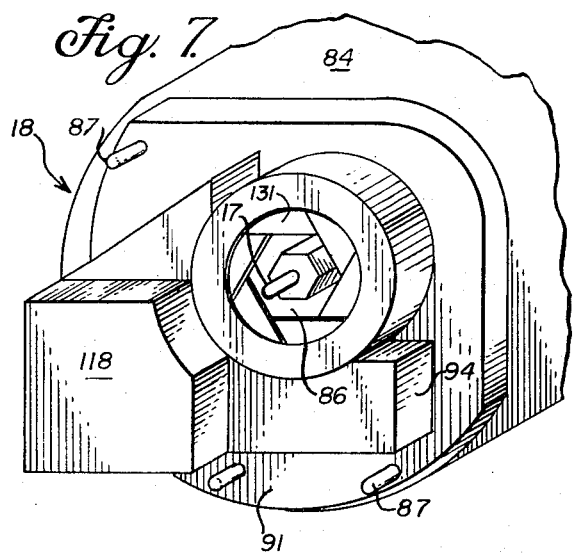
Fig.13.
Fig.12.
Fig.11.
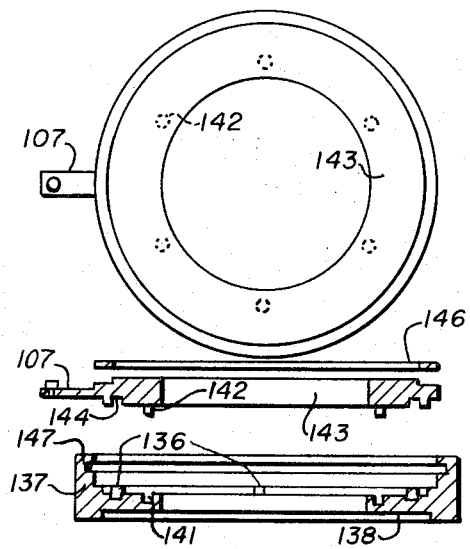
Fig.10.
INVENTOR
JOHN B. CAHOON JR.
JOHN B. CURREY
DONALD L. EMIG
BY Roland A. Anderson
ATTORNEY

INVENTOR
JOHN B. CAHOON JR.
JOHN B. CURREY
DONALD L. EMIG

BY Roland A. Anderson

ATTORNEY

INVENTOR
JOHN B. CAHOON JR.
JOHN B. CURREY
DONALD L. EMIG

BY Roland G. Anderson

ATTORNEY

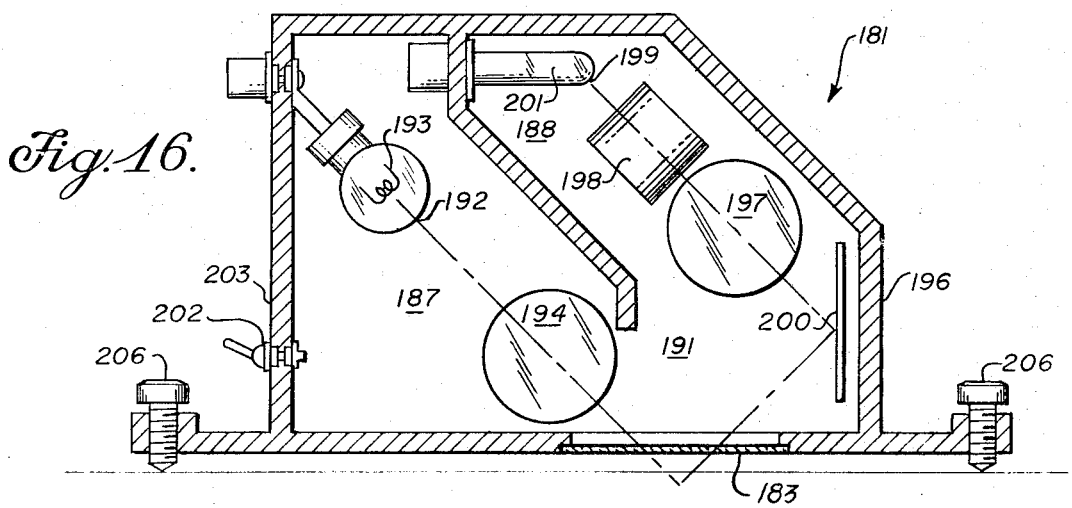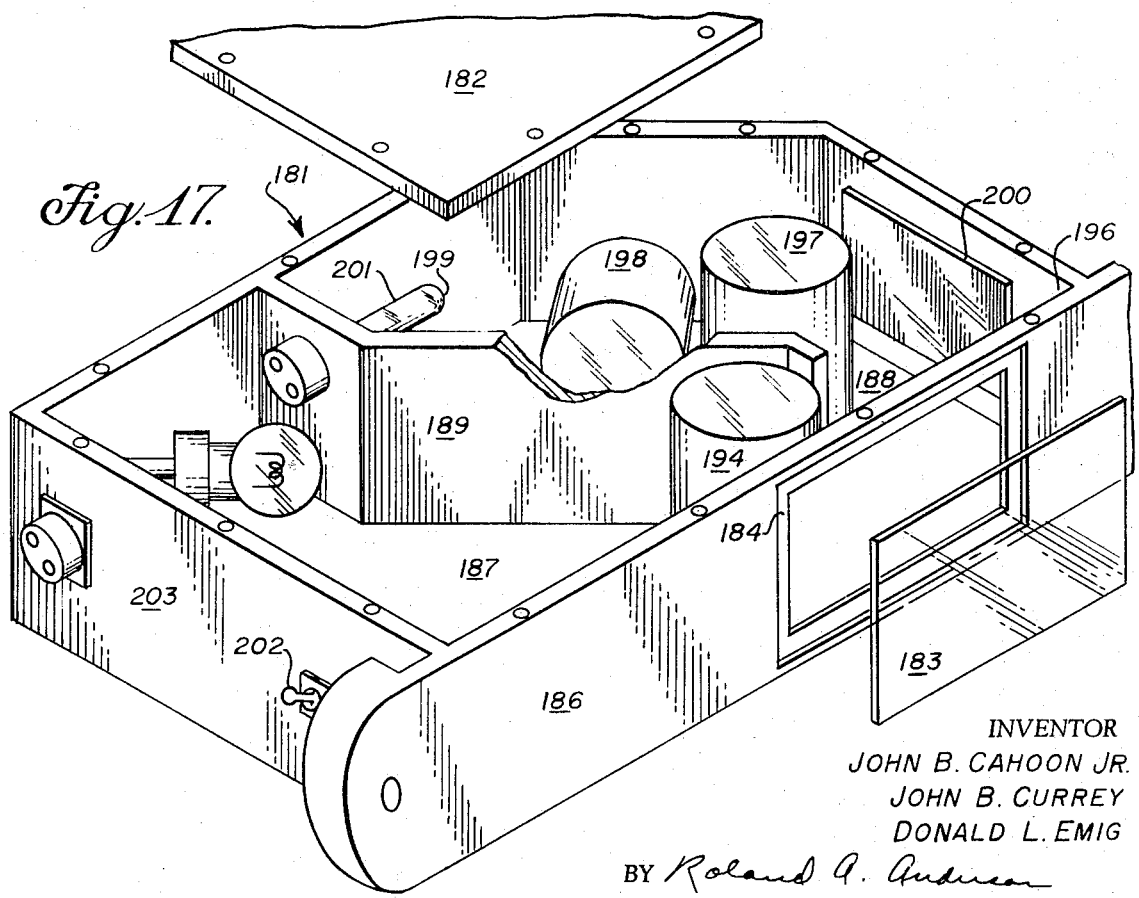

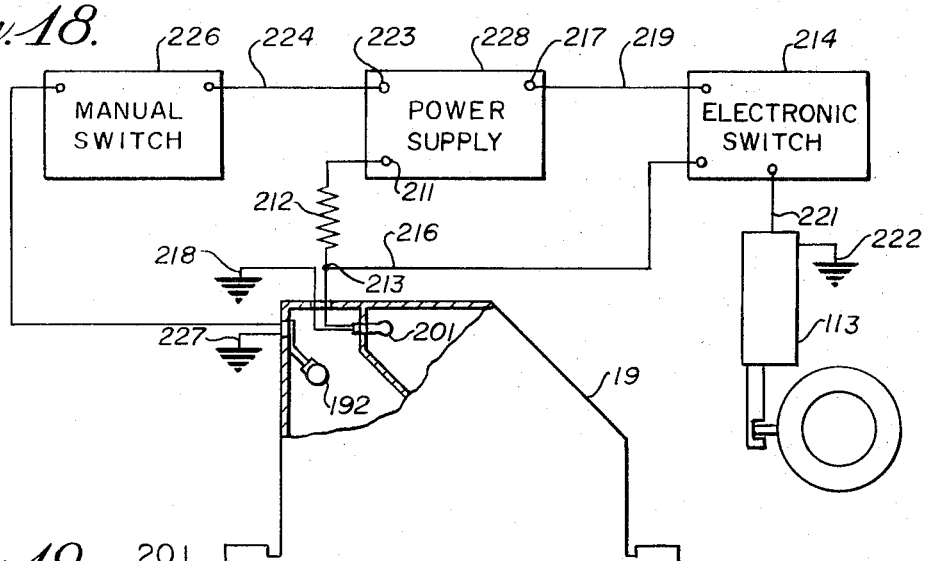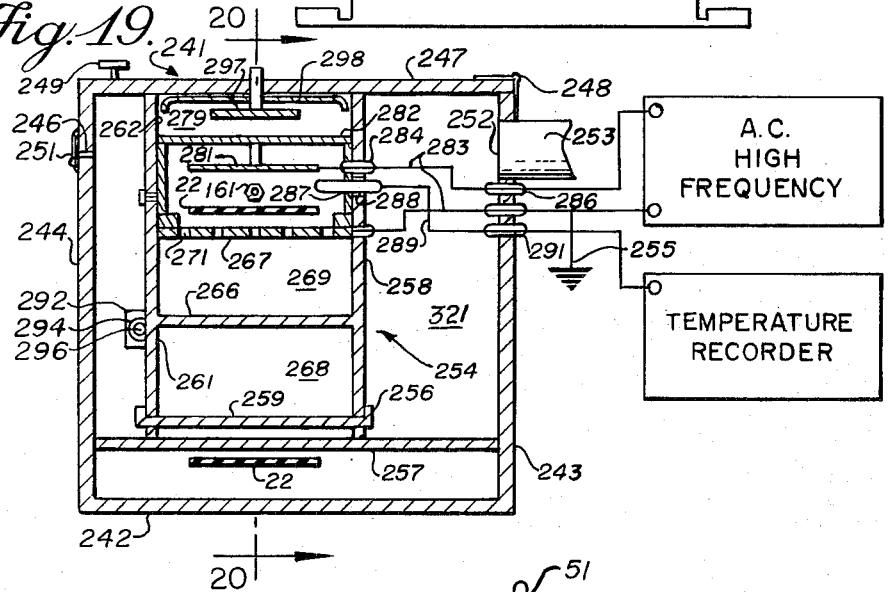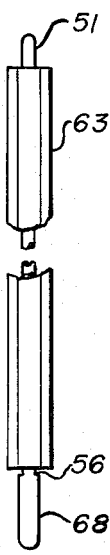

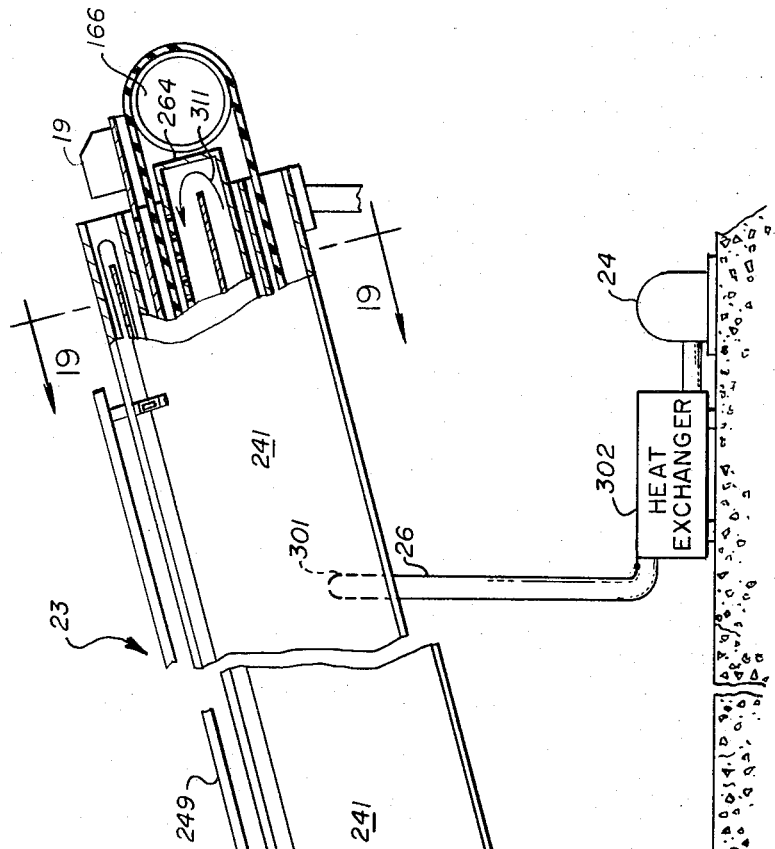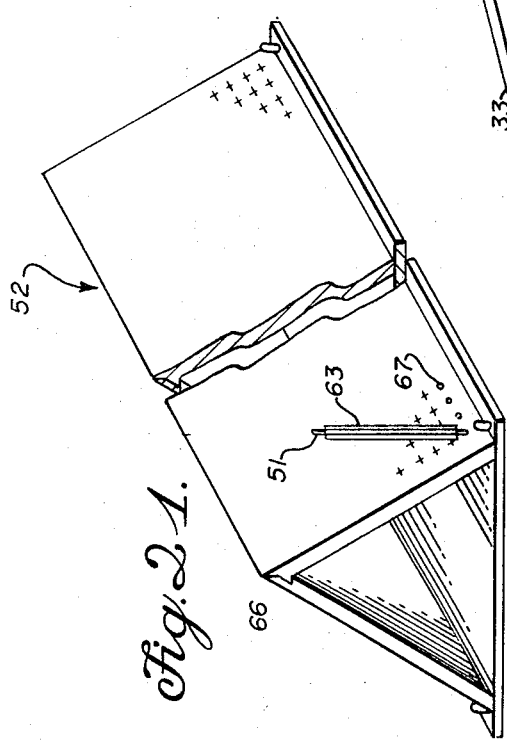

METHOD AND APPARATUS FOR EXTRUDING CERAMIC TUBES

This invention relates to an extrusion method and apparatus for producing ceramic tubes. More specifically, the invention relates to a method and an apparatus having unique extruding-cutting, drying and sintering functions which cooperate to produce ceramic tubes to exact tolerances. The preferred embodiment is particularly adaptable to producing high tolerance ceramic tubes containing radioactive or toxic materials for fuel or moderator elements in neutronic reactors.

The invention provides a method and apparatus for scoring or cutting ceramic tubes to predetermined lengths and tolerances, and for thereafter conveying, drying and sintering the tubes without any substantial relative changes in the dimensions thereof. The cutting function is accomplished by operation of a plurality of cutting blades mounted around the tip of an extruder mandrel extending from an extruder and adapted to move transversely against the tube and mandrel whereby the tube is cut or scored to a predetermined depth upon actuation of the blades by a photoresistance system or other means when a predetermined length of tubing has been extruded. A loosely woven heat resistant conveyor belt positioned in close tolerance with respect to the extruder carries the tubing through a dryer. The tube is dried by a combination of heating and forced ventilating means in which the entire length of the tubing within the chamber is maintained at a temperature within a critical range in which dimensional distortions do not occur. In the preferred embodiment, additional novelty is provided in the arrangement and operation of the various heating and forced draft means; specifically forced draft through the belt, countercurrent forced draft through the drying chamber, a plurality of dielectric heaters, and resistance strip heaters. The tubing is removed from the belt at the dryer box outlet, at which point the tubes are dry enough to be handled and are easily severed at the scored points by application of a slight pressure against the score markings. The tubes are ordinarily air dried in baking step in which combustibles are oxidized. In order to maintain relative tolerances in the sintering step the tubes are individually mounted on mandrels and sintered in a selected atmosphere at an ultra-high temperature under conditions in which heating of each tube is uniform. Further novelty resides in the particular ceramic consistency and in other details and precise embodiments.

In the present age of nuclear reactors, high speed missiles, jet or rocket propulsion engines and many other scientific fields of endeavor, there has been a gradual development of a high temperature technology. Because of high temperature chemical and physical stability and resistance to corrosion, erosion and many other forms of attack, ceramic materials have already been adapted and accepted as structural building materials in this technology. In nuclear reactors ceramics are commonly used for cylindrical, plate and tube-type fuel elements, and chemical methods for producing such ceramics in the desired form and with the desired physical characteristics have been worked out for many applications. However, manufacturing or fabrication techniques have generally lagged behind with the result that ceramic bodies and particularly ceramic tubes cannot be mass produced for high temperature use with dimensional tolerances of a few mils from true along the length of the body. Such tolerances are desired, for example, in nuclear fuelled and unfueled coolant tubes for high speed, gas cooled, mobile reactors in which considerable thrust is developed by the gas flow, and in conventional tubular ceramic fuel elements for power reactors.

In the prior art production of tubes, ceramic cylinders and other elongated ceramic shapes, a suitable mix of the ceramic together with binder, liquid and other material is simply molded, extruded or pressed by methods generally conventional in the ceramic and metal forming arts. Unlike the ordinary ferrous and non-ferrous metals, however, ceramics tend to warp and shrink greatly upon the subsequent drying, baking and sintering steps necessary to produce a dimensionally stable product of high structural strength. Such shrinkage and warpage may be as high as 30% from the original wet shape. Attempts to minimize this phenomena in the preparation of compacts and shapes for reactor work have in the past been based upon a calculated shrinkage and development of mixtures and techniques in which warpage does not occur. Tubular shapes present a particular problem and until the present no method for producing tubes of high dimensional tolerances and exact lengths has been available.

An additional problem arises in the method of severing individual wet-ceramic tube sections. The use of blades or wires moving at an angle normal to the longitudinal tube axis and synchronized with the direction of motion sets up friction drag forces which result in a lateral distortion adjacent to the plane of the cut. This problem is aggravated by the additional problem of supporting the tube sections as they emerge from the cutting means; being in a highly plastic physical state, a small differential pressure along the tube surface, as produced by individual handling with fingers or manipulators, causes deformation. This latter problem cannot be entirely avoided by extruding vertically downward since the weight of the wet extruded material exerts tensile forces on the column resulting in uneven wall thickness.

A further problem exists in transporting the extruded pieces to or through a drying cycle without loss of tolerances caused by any one of several factors. The conveyor or other handling means itself tends to deform the ceramic at the point of contact upon being removed from the extruder-cutter. Uneven heating or temperature gradients during drying caused warpage, the tubes generally bowing in the direction in which moisture is removed most rapidly. A special problem thereby arises in removing moisture from the part of the tube in contact with the support means, as along a flat side resting on a flat surface. In past methods, adequate provision has not been made for rapid removal of water vapor from the surrounding atmosphere whereby drying is optimized. Where sintering is required, additional factors such as high temperature stresses and loss of strength also tend to deform or warp the tube.

From the foregoing it can be seen that there exists a need for a method and an apparatus for producing high tolerance ceramic tubes and other elongated shapes for use in neutronic reactors and other high temperature application. It is requisite, of course, that the apparatus and method overcome the extruding-cutting and heat treating problems discussed hereinbefore in avoiding deformation and shrinking of the ceramic material. In addition the maximum structural strength and high temperature properties developed in the prior art methods should be retained. Economy, ease of manufacture and speed of operations should also be taken into consideration for the reason that adoption of ceramics for many nuclear reactors or research applications is dependent partially upon the economy of operation or cost. A further requirement for mass production is that the cutter mechanism be adjustable to provide varying lengths of ceramic tubes within very close tolerances in order that bundles of tubes of precisely the same lengths may be made up.

There has now been invented a ceramic extrusion method and apparatus for producing high tolerance, dimensionally stable ceramic tubes which may be easily severed into sections of precise lengths. The invention comprises an extruder-cutter apparatus and method in combination with automatic handling and drying means. Specifically, a cutter unit is mounted on the face of an automatic extruder which extrudes ceramic material of a critical plasticity through a die positioned around an extruder bar or mandrel. The mandrel extends outward from the die through the cutter mount. The cutter comprises a plurality of cutting blades suitably mounted and synchronized to clamp down in close tolerance around the protruding extruder mandrel and to return within a critical time differential, to score or partially cut the extruding ceramic tube. In the preferred embodiment the cutter blades are each pivotably mounted at one end thereof in overlapping relation on a cutter body rim mounted about the extruder mandrel. The distal end of each blade is pivotably and slideably attached to a slip ring mounted for rotary motion with respect to the rim whereby the blades make a single pass inwardly each time the ring is twisted and returned to the original position. In the preferred embodiment the actuating and return forces are provided by suitably linked solenoid and spring means respectively. The solenoid is, in turn, tripped by photoelectric cell means operated on light originating in an optical system and reflected from the extruded tube which has passed through the cutter, the change in reflection from each scored or cut portion changing the light intensity enough to provide sufficient signal.

In the preferred embodiment the tube is extruded onto a loose weave, thermally resistant conveyor belt extending in the same plane as the extruded tubing. This plane optionally slants downward slightly from the horizontal through a dryer box in order to take advantage of gravity forces in producing a slight tension force whereby compressive forces are eliminated. The speed of the belt is adjusted very nearly to, or slightly greater than the extrusion speed. In the drying chamber gas is forced upward from a feed chamber through apertures and through the loose weave belt to dry the under belt surface and remove moisture. The belt rides just below a plurality of dielectric heater strips and counterdirectional to flow of gas forced through the chamber. Further novelty resides in the position of resistance heater strips in the drying chamber and adjacent to a mixing chamber beneath the feed chamber. Uniform heat control is made possible through use of thermocouple means spaced along the chamber just above the belt whereby critical temperature conditions may be maintained, as discussed hereinafter. An outer box provides further insulation and vent passageways. At the belt exit end of the box the tubing is readily severed at the points scored by either mechanical or hand means and removed from the belt. After baking, the tubes are disposed on close tolerance mandrels positioned on slanting racks adapted to uniformly heat each tube in a sintering furnace. Further novelty resides in the precise steps and embodiments disclosed at length hereinafter.

In the operation of the apparatus the plasticity, of the wet ceramic mix and the coordination and timing of the extruder, conveyor and photoelectric-optical system in combination with the extruder-cutter is critical, as is hereinafter discussed. Regulation of the dry box and sintering furnace to provide uniform temperature and heating is also critical in the production of high tolerance shapes of exact lengths.

The invention provides a method and apparatus capable of producing 6 in., 0.4 in. diameter hexagonal tubes only about 3 mils or less out of straight and with a further loss of only 0.5 mils from shrinkage during drying and sintering. Using the same mixture in the prior art methods, no specific tolerances can be maintained without abrasive treatment and shrinkages from 5 to 30 percent with concurrent distortions of many different types are not unusual. Distortion caused by severing instruments are also avoided. Handling friction is reduced. An accurate and controllable heat and moisture balance is provided. The tubing is further scored in variable lengths within a close tolerance so that individual lengths may be severed upon application of a slight lateral force. The resulting tubes are adaptable to use as conventional ceramic fuel elements for fission reactors, for moderating coolant tubes within fluid cooled reactors and for multitudinous other uses.

Accordingly, an object of the invention is to provide a method and apparatus for extruding segments of dimensionally stable ceramic materials in elongated shapes. Specifically, an object is to provide ceramic tubing of small diameter and suitable for use as coolant tubes in neutronic reactors. A further object is to provide ceramic tubes free from dimensional distortions and within a 5 mil tolerance from straight over a length of 6 inches. Another object is to produce short segments of high tolerance ceramic tubing by an extrusion process as economical and rapid as prior art methods producing only low tolerance tubing. Another object is to provide ceramic fuel elements for conventional fission reactors.

A further object of the invention is to provide a method and apparatus which automatically scores or partially severs each side or a plurality of sides of ceramic tubing as it emerges from an extruder unit and while still formed around the extruder mandrel. A further object is to provide this cutting function by means of rapidly acting cutting blade structure cooperating at given intervals to cut within an adjustable close tolerance to and around the extruder mandrel without contacting same. A further object is to provide a cutter blade adapted to cut a preselected shape. Another object is to provide stationary structure suitably mounted on the extruder face to position and operate the blade structure. Another object is to provide a method and apparatus for automatically actuating the cutter to cut tubes of a given length. A further object is to provide structure which cooperates to position and actuate the blade structure by solenoid means and which further operates to return the blade structure to the initial position.

Another object is to provide a method and apparatus for automatically actuating the cutter mechanism each time a given length of tubing has been extruded since the previous cut or score. Another object is to provide photoelectric means operating with light reflected from the extruded tubing to trip the cutter mechanism. A specific object is to provide a suitable photoelectric-optical system. A further object is to provide wet ceramic material within a given range of plasticity for use in cooperation with the cutter-extruder and other features of the invention whereby the desired ceramic tolerances and characteristics are obtained. A further object of the invention is to provide handling and drying means for cooperation with the extruder-cutter means to obtain the desired ceramics. Specifically an object is to provide frictionless conveyor and dryer means in which surface drying of the ceramic tube begins almost instantaneously upon contact therewith after passage through the cutter assembly.

A further object of the invention is to provide a method and apparatus for uniformly drying ceramic tubing on a moving conveyor means without warpage, distortions or handling; another object is to provide uniform dielectric and convention heating coupled with rapid water vapor and heat removal for the ceramic; a further object is to provide dryer box structure in which these functions are accomplished. Another object is to provide temperature measuring and recording of the dryer box conditions. A further object is to provide an outer vent and thermal control box. Another object is to provide a drying method and apparatus in which ceramic tubing is uniformly maintained at a given temperature during the drying process.

Another object is to provide apparatus and a method for sintering tube sections without warpage or other dimensional distortions. A specific object is to provide close fitting mandrels disposed on slanting racks within a sintering furnace to obtain uniform temperature and heating characteristics.

The invention will be better understood upon consideration of the following description, examples and figures, of which;

FIG. 1 is a perspective view, partly schematic, of the extruder apparatus.

FIG. 2 is a cross sectional side view of the sintering furnace and sintering rack with two mandrels inserted in place.

FIG. 3 is a perspective view of several lengths of scored hexagonal shaped tubing.

FIG. 4 is a perspective view of a single segment of hexagonal tubing broken at the score marking thereof.

FIG. 5 is a cross sectional side view of the extruder diaphragm, face, die, and mandrel.

FIG. 6 is a plan view of the spider of the extruder shown in FIG. 5.

FIG. 7 is a perspective view of the cutter unit mounted on the front of the extruder diaphragm.

FIG. 10 is a plan view of one embodiment of a cutting blade.

FIG. 11 is a top plan view of a cutting blade mounted on the cutter body.

FIG. 12 is an exploded cross sectional side view of the cutter body, slip ring and snap ring.

FIG. 13 is a top plan view of the slip ring.

FIG. 16 is a side plan view of the optical system of the photoresistor unit, details being partially omitted;

FIG. 17 is a perspective view, partly cut away and exploded, of the assembled photoresistor unit.

FIG. 18 is a circuit diagram of the photoresistor unit in combination with the power supply, electronic switch and solenoid driven cutter.

FIG. 19 is a cross sectional view of the dryer unit across the transverse axis thereof.

FIG. 20 is a cross sectional side view of the dryer unit taken along line 20—20 of FIG. 19.

FIG. 21 is a cross sectional side view of the sintering mandrel having a ceramic tube mounted thereon.

FIG. 22 is a perspective view of the sintering rack.

Figure 8:
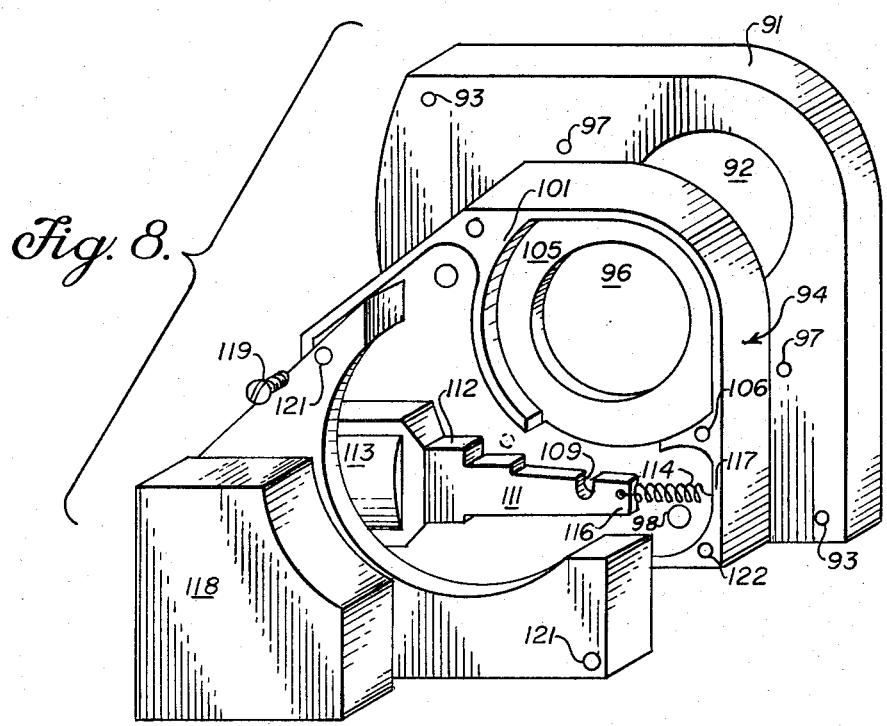
FIG. 8 is an exploded perspective view of the base plate, housing and cover of the cutter unit.

In the practice of the invention, it is first necessary to provide or determine the specifications and tolerances of the ceramic pieces desired to be produced, i.e., physical shape, chemical content and dimensions. These may vary within large limits depending upon the application or purpose for which the ceramics are intended. The crude tolerances of the prior art solid and tubular elongated shapes are attained when no particular care is exercised, even though the method and apparatus of the invention are adaptable to exacting requirements for the mass production of ceramic pieces for reactors, e.g., fuel elements, high temperature experimentation, thermo-nuclear research, space propulsion vehicles and for related embodiments used in high temperature technology.

More specifically, in the fabrication of high temperature neutronic reactors, particularly those which are designed for stationary or mobile gas cooled operation, ceramics are frequently the only material which meet the exacting neutronic, high temperature and structural requirements. For example, beryllia has good moderating properties in addition to being stable and structurally strong at high temperatures; it is therefore commonly selected as a moderator material; and in gas cooled reactors one method or configuration in which this moderator is employed is in the shape of small diameter coolant tubes. The beryllia may be in combination with other additives, such as aluminia. It may also be fueled so that when a plurality of fueled beryllia tubes are assembled together, there is formed a critical mass consisting essentially of a homogeneous mixture of fuel and moderator with voids or coolant channels therethrough in a longitudinal direction.

In the design of coolant tubes for neutronic reactors, the inside and outside diameters are ordinarily determined by design considerations rather than the limits of manufacturing techniques. However, the optimum design size of coolant tubes, particularly for high power densities, such as those contemplated for mobile reactors, is small, of the order of ½ – ¼ in. outside diameter or smaller. The tubes, of course, may be of various exterior cross sectional shapes, such as round or hexagonal, as shown in FIG. 4, and of various lengths for assembly into bundles. Density requirements of such ceramic pieces, regardless of the contemplated temperature of use, are ordinarily above 50 percent of theoretical and for the most economical neutronic operation densities in the range above 75 percent theoretical are required. Also, in order to attain the high strength requirements at high temperatures, e.g., 1000° C or higher, it is essential that the ceramic be one which forms or is formed from fine grains which are evenly developed during drying, baking and sintering, so that grain growth is not irregular.

Accordingly, in the practice of the invention there is first provided a liquid slurry or mix of beryllia, which also may contain diluents, urania fuel, and, if desired, carbonaceous binder and lubricant, in proportions and forms known to yield the characteristics desired in the finished product. In general such mixes are known in the prior art, several specific mixtures being disclosed hereinafter. Commonly, beryllia and urania are precipitated from soluble solutions with hydroxides. Beryllia powders and mixes for use in the practice of the invention having the desired beryllia structural characteristics may also be manufactured according to the teachings appearing in the following copending U.S. Patent Applications assigned to a common assignee, the United States Atomic Energy Commission, by Mr. John B. Cahoon, Jr.: Ser. No. 852,920, filed Dec. 18, 1959; and Ser. No. 843,900, filed Oct. 1, 1959. It will also be understood that the practice of the invention is not limited to the use of beryllia ceramics, but may be extended to many or most other common ceramic materials prepared according to the teachings of the prior art, for example, non-limiting examples being alumina, zirconia, urania, and various clay mixtures. Many such materials have already been used in the preparation of reactor tubular fuel elements.

While slurries or wet mixes of finely divided beryllia or other ceramic material dispersed in a solvent, with or without other additives, may be easily prepared by various prior art methods, the adjustment of the consistency or plasticity is quite critical. The desired consistency cannot be stated in terms of specific ratios of materials or chemical structure, but generally must be determined empirically for any given mix. Small variations may occur even in individual batches unless pH and moisture content are closely controlled. Specifically the consistency or plasticity must be adjusted so that the tube or other elongated shape will hold its shape as it is extruded from the extruder-cutter unit and is transferred to the conveyor-dryer unit, yet soft enough that distortions or small "humps" of ceramic around the scored or cut portion will tend to flow or migrate toward a common flatness as the tubing passes into the dryer unit. In so doing, the ceramic tends to partially weld together in the bottom of the cut. In addition, grain size and grain strength and growth considerations generally dictate that the mix be as fluid as possible consistent with the requirement of ridigity. The proper wet mix consistency is usually easily determined during trial runs.

Referring now to FIG. 1, there is shown an over-all or perspective view of a preferred embodiment of the entire extruder apparatus 11 comprising an elevated hydraulic extruder 12 on base 13 having suitable automatic controls, as exemplified by control panel 14. Mounted on the face (not shown) of the extruder over extrusion die 86 (shown in detail in FIG. 7) and around the extruder mandrel 17 (shown in FIG. 5) is the cutter assembly 18 actuated by photoelectric assembly 19 adjustably mounted in fixed spaced relation above conveyor unit 21 closely aligned with extruder mandrel 17, all of which is more specifically described in the preferred embodiment hereinafter.

The belt 22 of the conveyor unit extends downwardly from extruder 12 through a dryer box 23 having closely regulated heating means (shown in FIGS. 19 and 20) therein, including pressurized gas passing upward through blower 24, optional heater 302, and manifold 26 onto the under side of the belt 22 in a manner hereinafter described. A second blower 27 also forces gas or air through optional heat exchanger 28 into the lower end of dryer box 23, from whence it passes upward through the box counter to the direction of travel of the belt 22. The precise structure and functions of the box components, including the dielectric drying, are described and discussed hereinafter in detail, whereby uniform drying is obtained.

The space 31 between and around the conveyor opening (shown in FIG. 15), in the upper end of dryer box 23, and the cutter assembly 18 and extruder 12 is enveloped in flexible, transparent hood structure 32 (shown fragmentarily) with suitable "glove box" openings (not shown) for remote manipulations by hand therein. This provision is particularly necessary when certain fissionable fuels or toxic materials such as beryllia are being worked. The hood structure 32 is also equipped with vent ducts 33 attached to vent means 34 for withdrawing dust particles and radioactive gases as well as other toxic gaseous materials along with the gases introduced into the dryer box 23. Leads 36 from vent means 34 are also attached to dryer 23 for removing gases from portions of the dryer as hereinafter described. Catwalk 37 along one side of dryer 23 and the extruder 12 provides access to the elevated extrusion unit 11.

Conveyor belt 22 emerges from the bottom of dryer box 23 into hood system 41 sealed off from the atmosphere so that the vent gases are generally drawn upwardly dryer box 23 or into vent 34. Alternatively a forced draft (not shown) is provided through opening 42 to insure passage of toxic and radioactive gases upwardly through the dryer box unit 23. Glove compartments 43 permits severance and removal of the tube sections from the conveyor belt 22 within hood 41. Alternatively, automatic removal and stacking equipment (not shown) may be used.

In order to produce high temperature ceramic, there is also provided an electric fired or other annealing type air furnace (not shown) capable of being heated to temperatures of 400° C or greater, in which combustibles are burned out and the ceramic is baked preparatory to sintering. Sintering is accomplished, as shown in FIG. 2, by mounting individual tubes 63 on mandrels 51 vertically disposed on racks 52 within resistance furnace 53, the materials of construction, geometry and temperatures of the components having a certain critical relation hereinafter discussed. Use of the mandrels during sintering preserves the tolerances achieved in the extruding and drying steps.

In the use of the apparatus of the invention, generally, ceramic mix is first extruded from the die 86 and at the same time scored or cut by the cutter assembly 18 in predetermined lengths determined by the cooperative working between the cutter 18 and the photoelectric actuating means 19 which is tripped by reflection of light from scored portions of the ceramic as shown in detail hereafter. Belt 22, downwardly slanting at the precise angle of extruder bar 17, carries the extruded, scored tubing downward through dryer box 23, adjusted for uniformed heating, as hereinafter discussed and described. Upon exiting from dryer box 23 the casehardened tube 61, shown in FIG. 3 in hexagonal cross section, is easily broken or snapped at the scored points 62 by a slight lateral force to produce the uniform lengths 63 shown in FIG. 4 but having slightly roughened or irregular edges 64. These edges 64 may be ground to tolerance if desired, although except for an occasional rejects they tend not to be more than a few mils from true length. In practice the tube is scored in lengths somewhat longer than desired so that the tube is easily ground to the true tolerance desired.

Upon removal from the dryer 23 of extruder unit 11 the lengths of tubing are "case-hardened", i.e., dry enough to be handled without danger of distortions, but the tubes must be additionally heated or baked to burn out combustibles and then sintered before suitable for use as high temperature ceramics. Initial burn-out and baking may be accomplished in an electric fired or other annealing-type air furnace capable of prolonged heating at a temperature of 400° C and above. Sintering, as in the resistance furnace of FIG. 2, is accomplished by prolonged heating at temperatures of 1500° C and above, depending upon the ceramic material being treated. The precise temperature and duration of sintering necessary to promote grain growth and grain development varies with the chemical constituents of different ceramic materials.

Examining now the various components of the extruder unit 11 in detail, the extruder front face 71 may be adapted from various automatic extruders generally available in the art consisting, as shown in FIG. 5, of at least an extruder shell 72 which contains the wet mix (not shown) to be extruded by the piston (not shown) working in the direction of the arrow in FIG. 5. The forward portion of shell 72 is communicably mounted through face component 73 and comprises a detachable converging diaphragm 16 containing a circumferentially mounted spider 76 having openings 78 and central aperture 77, seen in FIG. 6, through which extruder mandrel 17 is held in locking engagement by nut 81. The extruder mandrel 17 extends outwardly through diaphragm opening 82 far enough to cooperate with cutter assembly 18 as shown hereinafter. Diaphragm tip 83 is threaded for engagement with die retainer 84 holding die pieces 86 which shape the ceramic piece, as to form an exterior hexagonal shape. As shown in FIG. 7, the assembled cutter unit 18 is adjustably mounted on the die pieces 86 over opening 82 by means of threaded supports 87 extending from dies 86 and threadably mounted through base plate 91.

Figure 9:
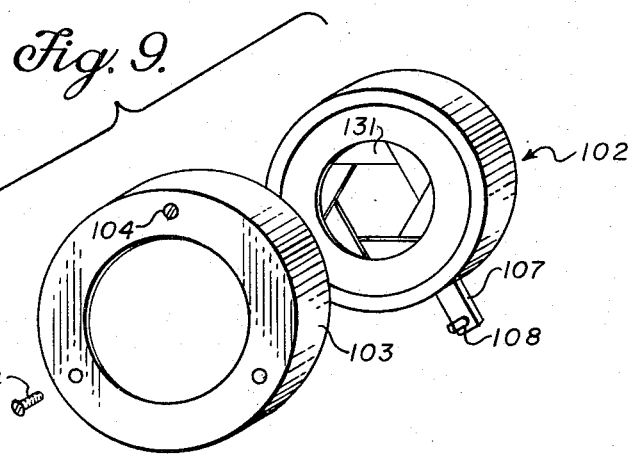
FIG. 9 is an exploded perspective view of the cutting unit and cutting unit mounting flange.

The cutter assembly 18 comprises a base plate 91 with extruding aperture 92 and threaded bores 93 for adjustable supports 87, as shown in FIG. 8. Upon base plate 91 is mounted housing 94 by means of bolts (not shown) communicating through bores 97 and 98 in base plate 91 and housing 94. Housing 94 is provided with cutting unit partition 101 defining compartment 105 and aperture 96 and adapted for close retention of cutting unit 102, shown in FIG. 9, which is held in place with mounting flange 103 by means of screws 104 communicating through the mounting flange 103 for retention in threaded bores 106. Actuating lever arm 107 protrudes from compartment 105 and is provided with pin 108 adapted for engagement with notch 109 of linkage element 111, particularly as shown in FIG. 8. Linkage 111 is pivotably attached to solenoid arm 112 cooperating with solenoid 113 carried by housing 94 whereby the linkage is pulled toward the solenoid against the restraining action of return spring 114 between the lower end 116 of linkage 111 and housing wall 117 when the solenoid is actuated as hereinafter discussed. Housing cover 118 is adapted to cover housing 94 by means of screws 119 communicating through holes 121 and into threaded bores 122.

The component details of cutting unit 102 are shown in FIGS. 9-13. The cutting surfaces comprise a plurality of elongated planar blades 131 each having a cutting notch 132 along one side thereof shaped to provide the cutting surface desired, e.g., straight, as shown in FIG. 10, for use in extruding polygonal tubes. In general the cutting notch should be shaped to match the shape of the cross section of the ceramic being extruded so that the cut or score will be uniform. Each end of the blade 131 is necked down; one end defines a small aperture 133 therein and the other end is provided with a longitudinal open ended slot 134. Each of the apertures 133 of the blades 131 is pivotally mounted over one of the pins 136 spaced around flange 135 on the inside of rim 137 of cutter body 138 defining extruding aperture 139. When all of the blades are properly mounted they are in overlapping relation, as seen generally in FIG. 9. Annular groove 141 is also provided around aperture 139 on flange 135 in spaced relation with rim 137 for cooperation with pins 142 of slip ring 143. The pins 142 mate with slots 134 of blades 131. The slip ring 143 is adapted for close engagement with rim 137 and also has an annular groove 144 on the same side as pins 142 and outwardly thereof for cooperation with the pins 136 of cutter body 138. Slip ring 143 is rotatably mounted in place against the cutter body 138 by snap ring 146 cooperating with annular groove 147 around the inside of rim 137, whereby the pivoted blades 131 are actuated inwardly as lever arm 107 is actuated downwardly by solenoid 113.

The shape of the score or cut desired on the elongated ceramic tube to be produced, as well as the desired depth of the cut, are two of the interrelated factors which must be taken into account in the positioning and movement or control of the blades 131, and therefore close tolerances and accurate positioning and adjustment are necessary. Particularly, also, where it is only desired to lightly score the extruded ceramic, the cutter assembly 18 must be closely aligned with the mandrel 17 so that the depth of cut is even on all sides. However, in any event the mandrel must extend outward beyond the cutting blades. In practice, for tubes of about one-sixteenth inch wall thickness the cutter blades should be adjusted to pass about one-half of the distance through the cross sectional wall thickness. A longitudinal variation in blade stroke of less than one-sixteenth of an inch along the tube is generally permitted, since tubes are generally cut a few mils long so that they can be accurately ground to within one or two mils of the length desired. The fact that the blades are in overlapping relation does not vary the results noticeably, since the score formed is continuous. It is believed that this factor does not effect the length by more than one blade width.

Obviously, equivalent mechanical functions may be used to replace the precise structure which cooperates to form the cuts or scores by a plurality of overlapping blades operating in unison in a direction normal to the extrusion axis. For example, each blade could operate rectilinearly. A modified rotary blade motion could also be used. In each embodiment, however, the two or more blades must cooperate to separately cut or score separate portions of the extruded ceramic along a single cross sectional plane.

The shape of the score or cut, and the magnitude of distortions arising therefrom also depends upon the extrusion speed, the length of the solenoid pulse and the time dependence of the conventional return spring. Except for the spring, which in practice returns the blades in less than 20 milliseconds, each of the other and factors may be treated as a variable which may be controlled by conventional means in combination with controls ordinarily provided for extrusion work. In practice an extrusion speed of 10–15 ft per minute has been found entriely satisfactory as long as the solenoid dwell time is no greater than 30 milliseconds. Although in the preferred embodiment, as discussed hereinafter, the timing of the cutter is coordinated by photoelectric means, an automatic timer connected to the extrusion apparatus controls is conveniently also provided (not shown), whereby an extruded hexagonal ceramic tube is scored or cut as a function of time rather than distance.

Figure 14:
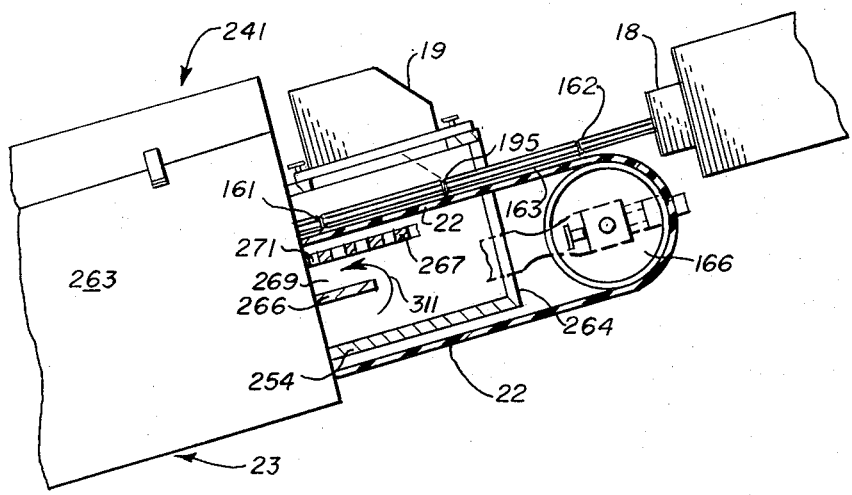
FIG. 14 is a cross sectional side view of a piece of scored tubing emerging from the cutter unit onto the conveyor belt, and passing thereon into a dryer box, partly cut away.
Figure 15:
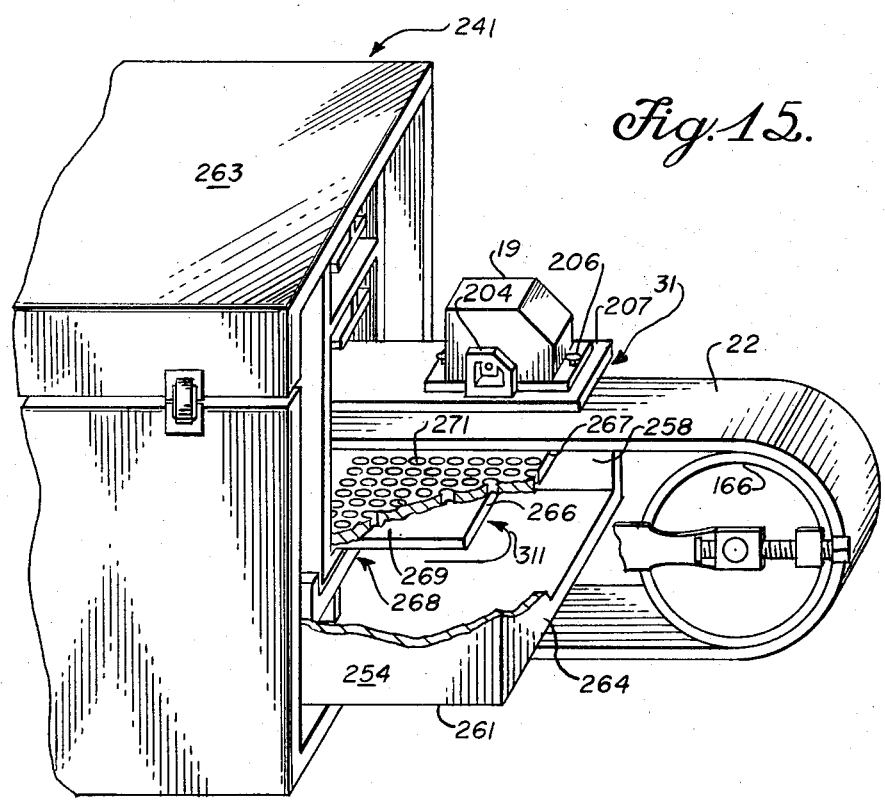
FIG. 15 is a perspective view, partly cut away, showing the upper end of the dryer box and conveyor unit.

As will be evident hereinafter, operation of the extrudercutter mechanism disclosed hereinabove must be coordinated, in the preferred embodiment, with photoresistance assembly 19, conveyor belt 22 and dryer unit 23. The relative positions of these units are shown in FIGS. 14 and 15 in which there is also shown extruded tube 161 having scores 162 emerging from cutter assembly 18 onto conveyor belt 22 aligned carefully, within a line-of-sight tolerance, with the plane of the lower surface 163 of the tube 161 formed within the extruder diaphragm. The extrusion plane is shown as an exaggerated tilt in the preferred embodiment, but any position approaching the horizontal is satisfactory.

Belt 22 is made of porous or loose weave, heat resistant material and lies perfectly flat as it passes into dryer 23. The forward end 164 of dryer 23, i.e., the end into which the belt 22 longitudinally passes, comprises, generally, an elongated outer insulating box 241 enveloping an elongated inner box 254 defining several chambers, the exact structure of which is described in a later paragraph. Specifically, box 254 comprises a lower heating and mixing chamber 268 in which air under pressure is introduced and heated to a uniform temperature. As shown by arrows in FIG. 15, the air from mixing chamber 268 passes through passage 311 at the upper and lower ends of inner box 254 into an intermediate feeder chamber 269. The top wall 267 of feeder chamber 269 provides a partition between the heated compressed air and the underside of belt 22 passing over pulley 166. Partition or wall 267 is provided with a plurality of regularly spaced perforations 271 through which the warm air passes upward, heating the belt 22 and, to an extent dependent upon belt porosity and air pressure, passing through belt 22 to quickly dry the outermost and lower surfaces 163 of extruded tube 161. Since the dimensional integrity of tube 161 is affected adversely by any vibrations, uneven motion and the passage of time, it is important that this drying commence as quickly as possible upon leaving the cutter assembly 18. In practice it has been found that when 0.4 – 0.5 in. diameter hexagonal tubing with 0.08 – 0.1 in. wall thickness is subjected to air currents having a temperature of the order of 200° F within the first foot or so of travel from the cutter, and to dielectric heating, the dimension is stabilized to normal vibration and shock, except handling, within the next 10–20 feet of travel.

As shown in FIG. 15, photoresistor assembly 19 is mounted over belt 22 on support 207 acorss side wall members 261 and 258 of inner box 254. Light is projected through an aperture in the base of the assembly 19 as described hereinafter, the light being normally reflected from extruded tubing back into the assembly. The position or location of the light on tube 161 (shown in place in FIG. 14) may be adjusted along the direction of extrusion by manipulation of the setscrew 206 in bottom plate 210 of the assembly 19. The entire assembly may be held rigidly by adjustable steel clip 204 on the support or other means within the skill of the art. The provision for adjustment permits close control over the tube lengths between scores thereon, as will be shown.

Specifically, photoresistance assembly 19 cooperates to energize cutter assembly 18 when scored portions of the tubing being extruded pass the specific point adjacent thereto upon which the light from the assembly is being focused. In the preferred embodiment of the assembly 19, light from a standard source within the assembly 19 is focused onto a narrow vertical slit along the extruding tube. Normally the light is reflected from the uppermost horizontal, flat surface of the extruded ceramic through a lens system into a photoresistor. Disturbances in the reflected light caused by the irregular surface of scored portions are discriminated by the tube which then relays the signal to an electronic switch. The switch then actuates the cutter blades.

The photoresistor assembly 19, as shown in FIGS. 16 and 17, comprises a housing 181 having cover 182 and containing the various components of the photoresistor-optical system. Window 183 is fastened into a recess 184 of the underside 186 of housing 181. Housing 181 is divided generally into two compartments 187 and 188 by partition 189 which terminates in the space 191 immediately above window 183. Light source 192 is positioned in the upper portion of compartment 187 within line-of-sight of window 183 and with the axis of its filament 193 generally vertically oriented. Light from the filament 193 traveling in the direction of the window is focused through a narrow slit 195 (shown in FIG. 14) onto the ceramic tube 161 by cylindrical lens 194, e.g., Lucite, positioned between the window and filament 193 with its longitudinal axis parallel to the axis of the slit desired. In practice it has been possible to focus a slit three-quarters of an inch long and one sixty-fourth of an inch wide onto the ceramic surface by optimization of distances and sizes to the sizes of the various components. This is sufficient to sufficiently control the operation of the cutter within the tolerances desired.

In the preferred embodiment the light filament 193 is positioned with respect to the tubing 162 so that the light is reflected at right angles back into compartment 188 where it strikes vertical mirror 200 fastened to housing wall 196. Light reflected from the slit 195 is then further reflected another 90 degrees, as shown by the broken line of FIG. 16, into a second cylindrical lens 197 having a longitudinal axis parallel to the first lens 194. Lens 197 further focuses the reflected light into a second narrow line which is then compressed laterally by a third, smaller cylindrical lens 198 having its axis rotated 90° from the axes of the other lenses. The slit 199 of a photoresistance unit 201 is positioned at the focal point of the third lens 198.

The lenses of assembly 19 are held in place by pins, straps, brackets, clamps or other equivalent means (not shown). In practice it has been found that once the lenses are carefully positioned within the assembly 19 no further adjustment is necessary other than that obtained with the exterior setscrew 206. Conveniently a manual switch for momentary interruption of the source 192 is provided on one exterior wall 203 of the assembly, as indicated by the toggle switch 202.

Mode of operation of the cutter-photoresistance actuating means is shown in the circuit diagram of FIG. 18, wherein there is shown the photoresistor 201 of assembly 19 connected to positive power supply tap 211 through resistance unit 212. The other terminal of the photoresistor 201 is grounded at 218 and the power supply and resistor units are selected or adjusted so that while light is reflected into the photoresistor 201 no current flows from junction 213 between photoresistor 201 and resistor 212 into switch 214 through lead 216. However, upon an increase in resistance of the photoresistor 201, current flows from junction 213 into switch 214 which is connected to tap 217 of power supply 228 through lead 219. The signal thus entering the switch from junction 213 actuates a momentary discharge of current into solenoid 113 through lead 221. This is accomplished by discharge of a capacitor, by amplification of the pulse of current from the junction 213 directly into solenoid 113 by direct switching of the current from the power supply, or by other conventional means all well known within the art. The dwell time of the solenoid must be coordinated with the extrusion speed as noted hereinbefore. Solenoid 113 is grounded at 222 and when actuated serves to operate the cutter unit 18 as disclosed hereinabove. Light source 192 operates off of tap 223 of supply 218 by means of line 224 passing through manual switch 226 and is grounded at 227.

The electrical units connecting the photoresistor unit 19 and the cutter assembly, described hereinabove, are suitably wired, and the switching mechanism and other components not otherwise physically displayed in the drawings are appropriately placed on the extruder control panel or elsewhere as desired. Obviously, equivalent components for the photoresistance assembly and circuit may be substituted to provide a different means for actuating the cutter blades than that shown herein as the preferred embodiment. Modifications within the skill of the art may be necessary in the event the upper surface of the ceramic being extruded is not flat.

In the operation of the cutter-extruder units to extrude a ceramic material of the desired cross sectional shape, the die pieces 86 and mandrel 17 of the correct dimensions and geometry are assembled within the extruder 12, taking care to orient the die pieces, in the case of tubes with flat sides, so that the bottom tube side will be extruded in the same plane as the conveyor belt 22. The cutter assembly 18 must also be carefully positioned so that the cutter blades 131 each squarely engage the respective flats of the extruded ceramic, e.g., a ceramic tube having six sides, in the preferred embodiment, and cut into the flats to the desired depth. Obviously, different numbers of blades and/or cutter structure are required for different tube cross sectional configuration. The depth of the cut may be regulated by varying the angular orientation of the cutter body 138 and the slip ring 143 or by substituting an entire assembly 18 of different dimensions.

After assembly is complete, the extruder is loaded with a mix of the proper consistency, as discussed hereinbefore. The power supply 228 for the cutter assembly 18 and for the photoresistor assembly 19 are turned on. The dryer unit 23 is adjusted to a uniform temperature and to other conditions as specified hereinafter. Conveyor belt 22 is operated at a speed approximating the speed at which the tube is to be extruded by energizing variable speed belt motor 278, shown in FIG. 20.

As soon as all of the foregoing units are operating satisfactorily, the extruder is started by means of conventional controls and adjusted preferably to an extrusion speed of 10–15 ft/min. The speed of the belt is carefully adjusted to be as fast, or slightly faster than the extrusion speed, so that the only mechanical forces acting upon the extruded ceramic are those of gravity and a very slight tension. Toggle 202 of manual light source switch 226 is then turned to the off position momentarily. This reduces the amount of light reflected into photoresistor 201. The resistance of the photoresistor therefore rises and electronic switch 214 energizes solenoid 113 momentarily. Solenoid 113 pulls lever arm 107 upward, thereby rotating slip ring 143 slightly and pivotably moving blades 131 inwardly until they engage and cut into the flats of ceramic tube 161. Return spring 114 then cooperates to return slip ring 143 and blades 131 to their initial positions.

Upon the return of the blades 131 to their normal starting position there remains a score 162 in each flat side of a cross sectional plane of extruded ceramic tube 161. The score or cut is clearly defined, but because of the plastic consistency of the mix and the surface tension of the fluids contained therein the bottoms of the cuts to some extent fill in. The remaining score, however, is clearly visible and structurally tends to divide the tube into segments. As the ceramic moves from the cutter assembly 18 over the end of mandrel 17, bottom surface 163 comes into contact with belt 22. If the belt height is properly adjusted, as discussed hereinabove, the ceramic merely extends in the original directional plane of the mandrel and die pieces without lateral distortion. This alignment can be adjusted to a very close line-of-sight tolerance; specifically, in practice a final lateral distortion of less than 2 mils per 6 in. length has been attained, and obviously other errors in the drying process also contribute greatly to this dimensional change.

Normally the window 183 of photoresistance assembly 19 rides only a quarter to half an inch above the ceramic surface 161, and the light from source 192 forms a narrow slit 195, perhaps one sixty-fourth of an inch in width in the preferred embodiment, on top surface 161 at right angles to the direction of travel. As the scored portion 162 travels under the assembly 19 and into the area lighted by the slit 195 there is a distortion in the reflected light, and the cutter blades 131 are again actuated in a manner substantially as described hereinbefore. The apparatus of the invention then continues to automatically score the tube at the given intervals of length until the power supply is de-energized.

After passing under the photoresistance assembly 19, the belt 22 continues into the dryer unit 23 shown in FIGS. 19 and 20. The function of the dryer is to evenly dry the tube as it passes therethrough so that no distortions or warpage occurs within the limit of tolerances set. This is accomplished by rapidly drying the tube in closely controlled environment in which all portions of the tube and environment in a given zone of the dryer are held at the same temperature. Specifically, the dryer comprises an elongated outer insulating box 241 mounted on base 13, shown in FIG. 1. The outer box 241 comprises a bottom 242 and longitudinal back wall 243. Front longitudinal wall 244 covers only the bottom portion of the front, the upper portion 246 of the front being integral with removable top 247 hinged to back wall 243 at 248. Because of the extreme length and size of the box in the preferred embodiment, the removable top 247 is segmented (not shown), each segment being provided with handle 249, whereby the box may be opened and examined. Heat disturbance or loss at the joint between upper 246 and lower 244 portions of the front is minimized by stripping 251 fastened thereover. Slits 252 and vent structure 253 are provided along the back wall 246 for air circulation as disclosed hereinafter.

Within outer box 241 is elongated parallel inner heat resistant drying box 254 having a common close fitting top 247 and supported on heat resistant structure 256 suspended off the floor 242 by horizontal spaced supports 257. The box 254 is made of some conducting material, such as aluminum, which is grounded at 255. Inner box 254 comprises longitudinal back wall 258, bottom 259 and a front made up of a bottom wall portion 261 and upper portion 262, the latter being joined with top 247 of outer box 241 so that when the handle 249 is lifted the upper chamber 279 of the inner box 254 as well as the chamber 321 of the outer box 241 may be observed. Inner box 254 extends a short distance beyond the ends 263 of outer box 241. Outer box 241 has no end pieces, but upper end terminates in hood 32 and lower end is enveloped in hood 41. The lower portion of inner box 254 is enclosed by end panels 264 as shown in FIGS. 15 and 20. Inner box 254 also contains lower and upper longitudinal and horizontal partitions or floors 266 and 267 respectively. Lower partition 266 does not extend guite to the end panels 264 so that an opening 311 exists between lower chamber 268 and intermediate chamber 269. Upper floor 267 is perforated with holes 271 of small diameter spaced closely together in a regular fashion; specifically a series of one thirty-second in. diameter holes spaced 1½ in. apart, and with one sixty-fourth in. diameter holes at the centers thereof has been found satisfactory in performing the function of drying the under side of various sizes of ceramic pieces.

Closed belt 22 rides over upper pulley 166 supported by inner box 254 on the front thereof and upon lower pulley 277 powered by variable speed motor 278. The belt 22 is made of a thermally stable material, such as fiberglass, woven loosely to permit passage of warm air therethrough. The belt 22 passes downward through the upper partition 279 of inner box 254, riding on perforated floor 267 and returns in open chamber 321 between bottom 242 of outer box 241 and supports 257. A plurality of flat dielectric heating strips 281 are longitudinally supported in a portion of the box 254 starting at end 263 about ½ - 1 inch above the belt 22 within chamber 279 by ceramic supports 282, the exact length and spacing being dependent upon the size of the cross sectional size of the extruded ceramic. Leads 283 for the strips 281 extend out through insulated plug 284 in inner wall 258 and insulated plug 286 in outer wall 243. A conventional high frequency source (not shown) is provided to operate at voltages up to about 2000 volts. An interlock (not shown) may also be used to break the dielectric heating circuit, in interests of safety, when handles 249 are lifted.

When the extruder is in operation, induced heating within the ceramic material caused by the dielectric heating quickly raises the temperature of the extruded ceramic to a point at which there is appreciable vaporization of water from the surface thereof.

A plurality of thermocouples 287 are also communicably disposed in spaced relation along wall 258 inwardly into the area between belt 22 and heating strips 281. Thermocouples 287 communicate through wall 258 at 288; leads 289 therefrom pass through outer wall 243 at 291 and are joined to appropriate conventional temperature measuring and indicating means (not shown) conventional within the art. Conveniently, these temperatures may be upon the master control panel 13 of the extruder. The thermocouple junctions are located a distance from the belt approximating the median distance of the centerline of the extruded plastic, thereby giving an indication of the temperature conditions resulting from the various sources of heat at that location, as hereinafter discussed.

Additional heating for inner box 254 is provided by a plurality of longitudinal resistance heating elements 296 and 297, along the length of the dryer 23, for mixing chamber 268 and drying chamber 279, respectively. In the preferred embodiment the lower resistance heating strips 296 are fastened to the outside of wall 261 within plastic channel strips 292 backed with reflecting aluminum foil 294. Upper strip 297 is disposed within the chamber 279 proper, and the upper portion 247 of the chamber 279 is backed with reflecting aluminum foil 298. Suitable leads are provided (not shown). In practice these strips extend the entire length of the box 23, variable controls being used for each strip or for sets of strips so that temperature conditions within the box 254 can be adjusted.

Air or other specific gases are provided for the lower mixing and heating chamber 268 by means of conduit 26 entering the center of the longitudinal length of chamber 268 at 301. Pressure is provided by means of blower 24 or other means and optionally the gas is heated in exchanger 302 prior to entrance into chamber 268. The air volume and pressure and the temperature requirements are dependent upon the size and number of openings 271 in floor 267 and upon the temperature of operation as more fully disclosed hereinafter.

Gas or air is also forced under pressure into the exit end of chamber 279 through conduit 42 by blower 27. Optional heat exchanger 28 is also provided. The exit end of chamber 279 is generally sealed at 306 to prevent back pressure, and/or the lower hood 41 is maintained at sufficient pressure to override the blower pressure. The gas or air thus provided passes through the entire chamber 279 and serves the purpose of quickly removing the large amounts of water vapor released during the drying process. This function is of critical importance since the drying, in fact, does not proceed properly unless a sufficient head of air is provided to maintain the lower, exit end of the drying chamber 279 entirely free of water vapor.

In the operation of the drying unit 23, the blowers are first energized to provide currents of air or gas through the dryer, and the various heating means are turned on and adjusted until an equilibrium temperature condition is achieved, as hereinafter discussed. Air suffices as a drying gas as long as there are no chemical interactions with the material being extruded. For example, when the ceramic contains a reactive metallic component, such as uranium metal, an inert gas may be necesssary to prevent oxidation at the drying temperatures. Gas pressure required for optimum drying conditions both through the exit end of chamber 279 and through the apertures 271 beneath the belt 22 must be determined empirically for any given geometry and other conditions. However, when a sizeable pressure and flow of air is provided, further control is generally most easily accomplished through regulation of the various heating means.

In the preferred embodiment gas entering the mixing chamber at opening 301 is previously heated to a temperature in the range of 300°–400° F. This warm gas then spreads throughout the mixing and heating chamber 268 where it is further heated by resistance heater 296, the chamber tending to assume a uniform temperature which may be regulated by various heating means and by the volume and pressure of gas. The gas then flows through the openings indicated by arrows at 311 at the ends 264 of inner box 254 into feeder chamber 269. The temperature of the feeder chamber 269 is uniform without, being heated by gas flow and by conduction from the four longitudinal wall surfaces by which it is defined. The heated gas then flows through openings 271 into chamber 279 in which a temperature preferably in the range of 200°–300° F is indicated by the thermocouple. Under these conditions the gas forced upward through belt 22 tends to remove moisture from the tube underside 163 at about the same rate as the main gas stream sweeping up through chamber 279 removes moisture from the upper portions of tube 161. At the same time water within the ceramic tends to migrate to the outer surface under the influence of dielectric heating. Only uneven drying of the bottom, with consequent distortion is obtained when flow through the belt is interrupted. When these variables are properly regulated the tubing removed from the exit end tends to be completely hard and free of entrapped water.

At the same time chamber 321, defined by outer box 241, is also continuously evacuated through openings 252. This has a primary purpose, when toxic or fissile, materials are being extruded, of reducing contamination caused by vaporization and leakage from inner chamber 279. However, the double box structure is in general also necessary to achieve close temperature control so that all surfaces of the ceramic at a given cross section along the length thereof will be at the same temperature, whereby dimensions within the stated tolerances are maintained. The flow from inner chamber 279 also passes out the upper end 263 into the same vent system.

In the operation of the dryer box a set of conditions, or many sets of conditions, must be determined under which a relatively flat temperature profile along the length of the dryer box is obtained. Specifically, in order to prevent warpage of the ceramic tube the temperature should not vary by more than a few degrees per foot of travel and it has been found generally necessary to maintain the gas temperature variation along the central portion within 20° F to maintain tolerances. In addition, the degree of turbulence of the air must be sufficient to insure a uniform cross-sectional temperature at any given point along the box, in order to prevent non-uniform drying with consequent warpage. It will be understood that the plurality of various resistance heaters and dielectric heating means along the longitudinal length of the box must generally be individually adjusted or regulated, and that automatic recording means or regulating means conventional within the art is provided.

These conditions must generally be established separately for each type of ceramic material in the event that different temperatures are necessary to achieve the drying desired for the type and porosity of the ceramic. In order to do this the dryer box heaters, with the exception of the dielectric heaters, and the blowers are first all brought into operation prior to introduction of the ceramic on the conveyor belt. Readings of the thermocouple units spaced along and over the belt are taken and the heaters are then regulated individually until the readings on each thermocouple are generally within the ± 10° F of the range desired. However, this presents only an approximation of the true air temperature conditions within the space to be occupied by the extruded tube. Customarily a thermocouple is next attached to the top of the belt in place of the extruded tube and run through the dryer box. Readings are taken every 6 inches. The temperature profile is then examined and the heater units adjusted accordingly. Additional belt runs may be necessary. During the final belt run the individual thermocouple readings from the thermocouples within the box are correlated with the profile indicated by the thermocouple on the belt. Adjustments are made during the ceramic runs on the basis of this correlation.

When it is desired to dry a given extruded ceramic, the blower units providing forced draft under the belt and into the belt exit end of the dryer box are energized to provide sufficient constant turbulent flow to remove all heat and moisture uniformly. The resistance heater units are then energized and adjusted to the temperature conditions previously indicated to be required from the temperaturre profiles for the specific material being extruded. As indicated in the example the temperature within the central portion of the dryer box is constant generally within 20° F. The temperature at the ends s of the chambers generally drops off because of heat loss through the belt openings; however, care must be exercised to preclude a temperature gradient of more than a few degrees per foot longitudinally if distortion is to be avoided. Extrusion operations are commenced and the dielectric heaters are at the same time energized at a predetermined power level sufficient to remove all moisture. Adjustments may be made from time to time when necessary to insure constant conditions, particularly to preclude a temperature "bulge" along the box length with concurrent dimensional deformation.

While the preferred temperature and pressure conditions may vary somewhat for different mixes, a set of operating conditions found satisfactory in the preferred embodiment is stated in Example I. These conditions were found by variation of the various variables in numerous trial runs and other experiments, but do not necessarily represent a limitation upon other conditions which may be used.

When the dryer unit has been regulated properly, the tubing is completely dry and rigid upon arrival at the end of the conveyor unit as the base of the dryer. Access to the end of the conveyor is provided by glove compartments 43 through which the operator or other worker may reach without danger from radioactivity or toxic materials and sever the individual pieces of tubing. This may in every case be accomplished with a small amount of pressure transversely to the axis of the tube when the extruder-cutter is properly adjusted; and ordinarily the tube "snaps" across the scored point 62 as it is lifted and gently pivoted at the scored point. The individual pieces 63 are then stacked for baking and sintering. Sanding or grinding to size may be accomplished after any of these steps, since upon drying the tube is essentially of fixed dimensions. Generally only a few mils need be removed from each end 64 since the tubes generally "snap" or sever almost directly transversely across the scored points within a minimum of irregularity or roughness.

Upon completion of the drying steps and the severance of the tube into the lengths indicated by the scores thereon, the tubes are ordinarily next placed into a baking oven into which air is free to flow or in which the atmosphere may otherwise be controlled. Specifically, any conventional air furnace capable of attaining temperatures at which carbonaceous materials are oxidized completely, e.g., 400° C, may be satisfactory, although it may be desired to adapt the furnace to controlled venting and/or pressurized flow therethrough in order to effectively contain toxic and fission product gases. In the event the ceramic materials contain ingredients which chemically react with air, provision for an inert atmosphere may be necessary where physical or vaporization step is nonetheless desired. length After the baking steps the tubes are sintered in order to prepare them for high temperature applications. When the tubes are first heated to ultrahigh temperatures, e.g., 1000° C and particularly above 1500° C, the ceramic particles undergo grain formation and growth with resulting warpage and shrinking, until fully stabilized. By sintering under controlled conditions, the grain development is optimized with resulting control over density, physical strength and other properties. Such control is already accomplished in the art by selection of sintering atmospheres and temperatures for various ceramics. In the present process the warpage and shrinkage is also minimized or controlled during sintering by evenly heating each tube along its entire length while the tube is mounted on a mandrel which tends to restrain the tubes from dimensional changes, other than an even shrinkage in which the relative dimensions of the tube are retained.

Accordingly, the tubes 63 are individually mounted on mandrels 51 against abutting shoulders 56. The mandrel may be made of any material thermally stable at the sintering temperature and which additionally does not react or fuse with the ceramic materials undergoing sintering. In practice, molybdenum metal has been found satisfactory for various clay, beryllia and fueled beryllia ceramic materials. The mandrels may be mounted in the furnace in any manner which all portions of each tube are uniformly heated so that each tube, and each portion of each tube, is heat treated in the same manner, thus insuring uniform results.

In the preferred embodiment of the sintering furnace, shown in FIG. 2, the sintering furnace 53 comprises a rectangular structure having opposing walls 46 upon which are mounted in parallel horizontal alignment a series of resistance heating units 47 vertically spaced from top to bottom. Ducts 48 are provided for atmospheric control. An elongated mounting rack 52 of triangular cross section is disposed in the center of the furnace parallel to the resistance units 47. The rack 52 is preferably also made of molybdenum and comprises a flat ceramic base 57 upon which are flexibly mounted molybdenum side plates 58 fastened exterior thereof. The plates 58 are not rigidly mounted and therefore are free to expand and contract. In the preferred embodiment the plates 58 held in a slanting position by base pins 59 and are pivotably fastened at the top by tongue and groove fit 66. The angle of the plates is not critical but for any given heating geometry the positioning should be checked empirically to determine whether uniform heating is being obtained.

Molybdenum side plates 58 are provided with staggared horizontal rows of bores or recesses 67 adapted to receive the bases 68 of mandrels 51. Since the rows are staggared, self shielding of the mandrels is minimized and the mandrels and rack tend to reflect heat evenly so that each tube 63 is sintered under the same conditions. In operation, the tubes are each first individually mounted on mandrels 51 and in close tolerance thereto; and the mandrels are inserted into the recesses 67. A gas, such as hydrogen, which promotes regular grain growth is circulated through the furnace and the resistance heaters are gradually brought up to full temperature, generally above 1700° C. The sintering time varies with different ceramics but generally is a period of time not less than one hour, as determined by teachings already known in the art. See FIGS. 21 and 22.

EXAMPLE I

A series of exploratory extrusion runs were conducted using the extruder-cutter and dryer units of the preferred embodiment of the invention in order to determine the optimum operating conditions. In each instance the ceramic mix used consisted of 30 percent ball clay and 70 percent feldspar together with enough water that the tubing when formed would hold its shape while drying on the conveyor belt in the dryer box. The ceramic mix was considered to have no special utility but was a convenient experimental clay conventional in the art, and the mix further had properties similar enough to the beryllia runs contemplated that they could be considered equivalent for experimental purposes. Typical runs were 800 tube lengths each 5 – 6 in. long with a circular inside cross section of 0.3 in. diameter, and a hexagonal outside cross sectional diameter of 0.4 in. across flats. Typical tolerances achieved in the better runs were $\pm$ 5 mils on dimensions (across flats) and $\pm$ 2 mils camber (warp).

| | |
|---|---|
| Extruder | |
| Speed | 10–15 ft/min |
| Temperature | ambient |
| Cutter | |
| Depth of cut | 0.05 in. |
| Blade Dwell time | 20–30 milisec. |
| Light Slit Width | 1/64 in. |
| Dryer Unit | |
| Belt Composition | fiberglass |
| Belt Poroisty | readily penetrated by 2 psi air |
| Outer Box | |
| Length | 49 ft. |
| Cross Sectional Size | 12 in. × 12 in. |
| Pressure | Slight vacuum |
| Inner Box | |
| Over all Cross Section | 3 in. × 5 in. |
| Drying Chamber Cross Section | 3 in. × 2 in. |
| Openings — Size and Spacing | 1/32 in. dia. holes spaced every 1½ in. with 1/64 in. dia. holes centered therebetween |
| Length | 40 ft. |
| Drying Chamber Air Regulation | |
| Chamber Pressure | Not measured |
| Floor orifices — Inlet Pressure | Not measured — Slight positive pressure |
| Air Displacement | Not measured — Heavy flow, removing all heat generated in drying chamber |
| Drying Chamber Temperature Regulation | |
| Thermocouple Readings (½ in. above belt) | |
| Zone I (5 ft. from belt inlet end) | 120° F |
| Zone II (16 ft. from belt inlet end) | 200° F |
| Zone III (24 ft. from belt inlet end) | 200° F |
| Zone IV (38 ft. from belt inlet end) | 200° F |
| Blower Inlet Temp. — Lower End | Ambient |
| Floor Orifice Inlet Temp. | Not Measured — constant heat input |
| Drying Furnace | |
| Temperature | 1600–1900° F |
| Sintering Furnace | |
| Temperature | 1650–1800° C |
| Tolerance between mandrel and tube | 2–3 mils |

EXAMPLE II

Beryllia base ceramic tubes were extruded under the conditions and with the same dimensions and tolerances established with the clay mix of Example I. The resulting product had a 98 percent theoretical density and was of uniform reactor-grade quality.

The beryllia mix was produced by mixing together 70 percent beryllia powders of 0.001 to 1 micron particle size together with 30 percent binder-plasticizer. The binder-plasticizer consisted of two parts of a binder containing polyvinyl pyrollione acetate, polyvinyl acetate, and emulsifier (Mobilpar S) in combination with three parts of plasticizer containing one part glycerin and three parts water

EXAMPLE III

Beryllia base urania fueled ceramic tubes were extruded under the conditions and with the same dimensions and tolerances established with the clay mix of Example I.

The fueled beryllia mix was prepared by precipitating uranium nitrate into a slurry of beryllia particles, having a mean size of less than 0.001 to 1 microns by the addition of ammonium hydroxide. The resulting urania content was less than 10 percent that of the beryllia. The slurry-precipitate was then filtered and dried. Water was added during milling operations together with an amount of binder and plasticizer as described in Example II during mixing operations.

While the invention has been described with respect to several preferred embodiments, it will be apparent to those skilled in the art that numerous variations and modifications may be made within the spirit and scope of the invention and thus it is not intended to limit the invention except as defined in the following claims.

What is claimed is:

1. In an apparatus for cutting the walls of extruded tubing material to a variable depth as it emerges from an extruder, the combination comprising an extruder diaphragm and die, a mandrel extending outwardly from said die, a cutter body defining an aperture mounted over said die and around said mandrel extending from said die, a plurality of cutter blades adjustably mounted in spaced relation around said mandrel on said body for simultaneous inward movement transverse to the axis of said mandrel and to a position in close tolerance therewith in a single transverse plane, mean adapted to move said blades inwardly, and means for returning said blades to their initial starting positions.

2. In an apparatus for cutting the walls of wet extruded ceramic tubing material to a variable depth as it emerges from an extruder, the combination comprising an extruder including an extruder diaphragm containing die pieces mounted about the opening thereof, a mandrel extending outwardly from said die pieces, a cutter body defining an aperture mounted over said die pieces opening and around said extending mandrel, a plurality of cutter blades each pivotably mounted at one end thereof on said cutter body in overlapping spaced relation around said mandrel, means for simultaneously pivoting said blades inwardly to an adjustable depth, and means for returning said blades to an initial position within a predetermined length of time.

3. An apparatus for cutting the walls of wet extruded ceramic polygonal tubing material to a variable depth as it emerges from an extruder, the combination comprising an extruder diaphragm and die, a mandrel extending outwardly through said die, a cutter body defining an aperture mounted over said die and around said extending mandrel, a plurality of cutter blades each pivotably mounted at one end thereof on said cutter body in overlapping relation around said mandrel, the shape of each of said cutting blades being adapted to engate simultaneously the entire surface of one segment of said tubing having a predetermined cross sectional shape during pivotable movement inwardly, said blades cooperating to form a score or cut completely around said tube in one general cross sectional plane, means for simultaneously pivoting said blades inwardly to an adjustable depth for a predetermined length of time, means for returning said blades to the initial position upon the elapse of that time, and means for actuating said blade movement.

4. The apparatus of claim 3 in which the means for simultaneously pivoting said blades inwardly comprises a slip ring rotatably mounted over said cutter body and carrying structure adapted to move simultaneously inward the free end of each blade as said slip ring is rotated.

5. The apparatus of claim 3 in which said cutter blades are six in number and are individually positioned and adapted to each cut the one wall of a hexagonally shaped tube.

6. In an apparatus for extruding, scoring and moving ceramic tubing in exact lengths with low dimensional variations, the combination comprising an extruder assembly including a mandrel extending outwardly from the extruder die, a plurality of blades adjustably mounted over said die in spaced relation around said protruding mandrel and adapted to move simultaneously inwardly to a position in close tolerance with said mandrel in a single cross sectional plane generally transverse to the mandrel axis, means for moving said blades inwardly and outwardly simultaneously, handling means adapted to convey tubing from said extruder and said cutter blades with a minimum axial distortion, and means for automatically actuating said cutter blades every time a predetermined length of tubing has been extruded.

7. In an apparatus for extruding, scoring and conveying ceramic tubing of polygonal cross section in exact lengths and within exact dimensional tolerances, the combination comprising a horizontal extruder assembly including a mandrel protruding from an extruder diaphragm and die, a cutter body defining an aperture mounted over said die and around said protruding mandrel, a plurality of adjustable cutter blades mounted on said body in spaced relation around said mandrel and adapted to move simultaneously inwardly to a position in close tolerance with said mandrel in a direction normal to the central axis thereof, said blades being individually shaped to each engage the entire outer surface of one polygonal side of said tube being extruded, said number of blades equaling said number of outer tubing sides, means for actuating and controlling said blade movement, conveyor belt means traveling in the extrusion plane and adapted to receive the lower surface of said polygonal tubing without distortion of the longitudinal axis thereof, photoresistance means for determining when a given score marking has reached a given point on said conveyor belt, and means for automatically energizing said cutter actuating means when said score marking has reached said point.

8. The apparatus of claim 7 in combination with a ceramic tube being extruded from said extruder which is rigid enough to retain its shape yet plastic enough to yield to slight pressures and to spread or flow slightly under surface tension forces into said scored cuts in said tube.

9. The apparatus of claim 7 in which said belt speed is capable of being closely adjusted to the speed of extrusion.

10. The apparatus of claim 7 in which said photoresistance means is a photoresistor operating with a slit of light reflected from a transverse cross sectional surface area of one side of a hexagonal ceramic tube passing along said conveyor belt means.

11. In an apparatus for extruding, scoring and conveying ceramic tubing in exact lengths and within exact dimensional tolerances, the combination comprising a generally horizontal extruder assembly having a mandrel protruding exteriorly from an extruder diaphragm and die, said extruder being adapted to extrude ceramic tubing of generally hexagonal cross section with the bottom surface thereof in a generally horizontal plane, hexagonal beryllia base ceramic tubing extending from said extruder, said ceramic being plastic enough to flow slightly into cuts formed therein and yet rigid enough to hold its shape, a cutter body mounted over said die and defining an extrusion aperture penetrated by said mandrel, six cutter blades evenly spaced in overlapping spaced relation around said aperture on said cutter body, each of said blades being pivotably mounted on said body at one end thereof, each of said blades further being individually shaped to engage the entire outer surface of one hexagonal tube side in a transverse plane as said blade is pivoted inwardly, a slip ring rotatably mounted over said blades on said cutter body and adapted to control the inward pivot movement thereof, solenoid means for rotating said slip ring, a spring return for said slip ring, a loose weave fiberglass conveyor belt means mounted in the extrusion plane and adapted to carry said lower extruded tubing surface without distortion of the extrusion axis, means for reflecting a narrow slit of light from a portion of one hexagonal tube cross section into a photoresistor, and switching means for activating said solenoid when said amount of light reflected is substantially diminished.

12. In a method for forming cuts on the exterior surfaces of an extruded ceramic tube, the steps comprising extruding a ceramic tube from an extruder assembly including an extruder diaphragm, die, and extruder mandrel extending exteriorly from said die, rapidly moving a plurality of blades inwardly in simultaneous movement at given intervals in a plane transverse to the direction of extrusion to an adjustable position in close tolerance with the extending end of said mandrel, said blades being initially mounted in spaced relation radially around said extrusion mandrel, said blades being adapted to intercept the surface of said ceramic tube substantially in a single plane transverse to the direction of extrusion, whereby a score completely circumscribing said tube in a single plane is formed, and returning said blades at the conclusion of the inward stroke to its initial position after a swell time coordinated with said extrusion speed, said entire movement and return being adjusted to a period of time rapid enough to form a substantially continuous cut without a notching effect.

13. In a method for forming scores on the exterior surfaces of an extruded ceramic tube, the steps comprising extruding a hexagonally shaped ceramic tube from an extruder assembly including an extruder diaphragm, die, and an extruder mandrel extending exteriorly therefrom, said extruder being adapted to extrude the bottom side of said tube in a substantially horizontal plane, rapidly pivoting six cutter blades inwardly in a simultaneous movement at predetermined intervals in a plane transverse to the plane of extrusion to an adjustable depth in close tolerance with the extending end of said mandrel, said cutter blades being mounted in spaced overlapping relation radially around said extending mandrel on said die and adapted to each intercept one complete cross section of one tube side, whereby a score completely circumscribing said tube in a single plane is formed, and returning said blades at the conclusion of the inward stroke, said entire dwell time of said blades within said extruding plastic being adjusted to less than 30 milliseconds when the extrusion speed is no greater than 15 ft per second.

14. In a method for extruding and scoring tubing in exact lengths and within exact tolerances comprising the steps of extruding a hexagonal ceramic tubing through a diaphragm and die, and over a mandrel extending outwardly from said die, said extruder die being positioned to extrude said bottom tube surface in a generally horizontal plane, adjusting a conveyor belt adapted to receive said tube in the same plane as the extrusion plane of the lower hexagonal surface to a speed the same as the extrusion speed, focusing a narrow slit of light in a direction normal to the direction of extrusion onto one hexagonal side of said extruded tubing at an angle of incidence which reflects said light into an optical system which normally focuses said reflected light into a photoresistor, rapidly pivoting inwardly six cutter blades against the sides of said extruded tube in a single plane transverse to the extrusion plane to an adjustable position in close tolerance with said extending mandrel, said blades being adjusted to each simultaneously intersect and cut separate sides of said hexagonal shape, said initial cut of said blades being actuated by manual means, and thereafter automatically actuating said cutter by electrical means each time a signal is received from said photoresistance cell indicating a scored marking has passed through the zone upon which said slit of light is focused.

15. In a method for extruding and scoring ceramic tubes in exact lengths and to exact dimensional tolerances, the steps comprising forming a ceramic mix rigid enough to hole its shape when extruded yet plastic enough to flow slightly into depressions when extruded, extruding a hexagonal ceramic tube from said mix over a mandrel extending from an extruder die, said extrusion assembly being adapted to extrude the lower surface of said hexagonal tube in a horizontal plane, receiving and conveying said extruded tube on a conveyor belt traveling in the extrusion plane of said lower surface and substantially at the extrusion speed, focusing a narrow slit of light in a direction normal to the direction of extrusion onto the top hexagonal side of said extruded tube at an angle of incidence at which said light is normally reflected therefrom into an optical system, focusing said light entering said optical system, receiving said focused light from said optical system in a photoresistor and emitting an electrical signal indicative of the amount of light reflected into said optical system, initially rapidly pivotably moving inwardly six cutter blades against the six sides of said extruded tube in a single plane transverse to the extrusion plane to an adjustable position in close tolerance with said extending mandrel, said blades being exteriorly mounted on said die in spaced, overlapping radially relation around said mandrel and adapted to simultaneously engage each side of said extruded tube, returning said blades, said movement and return being correlated with said extrusion speed to cut said tube sides cleanly without forming notches, and thereafter electrically actuating and pivotably moving said blades each time a signal is received from said photoresistor indicating a score marking has entered said zone of said tube upon which said light is focused.

16. In the extrusion of moist elongated ceramic members and the subsequent substantial drying of same to rigid brittleness, an improved method for severing the elongated ceramic members into exact lengths and exact dimensional tolerances comprising the steps of forming the moist extrudable ceramic mix rigid enough to hold its shape when extruded yet plastic enough to flow slightly into depressions when extruded, extruding moist, elongated ceramic member from said material, circumferentially scoring the surface of the moist extruded member at at least one station therealong at which severance is desired, effecting said substantial drying of the extruded member, and applying a bending stress upon the dried member at said scored station thereby breaking the member proximate the scored station into separate lengths.

17. In the extrusion of moist elongated ceramic tubing and the subsequent substantial drying of same to rigid brittleness, an improved method for severing the ceramic tubing into exact lengths and exact dimensional tolerances comprising the steps of forming the moist extrudable ceramic material rigid enough to hold its shape when extruded yet plastic enough to flow slightly into depressions when extruded, extruding moist ceramic tubing from said material, circumferentially scoring the surface of the moist extruded tubing at at least one station therealong at which severance is desired, effecting said substantial drying of the extruded tubing, and applying a bending stress upon the dried tubing at said scored station, thereby breaking the tubing proximate the scored station into separate lengths.

18. In the extrusion of moist elongated ceramic tubing and the subsequent substantial drying of same to rigid brittleness, an improved method for producing and severing ceramic tubes of exact length and exact dimensional tolerances which comprises the steps of forming the moist extrudable ceramic material rigid enough to hold its shape when extruded yet plastic enough to flow slightly into depressions when extruded, continuously extruding ceramic tubing from said material, circumferentially scoring the surface of the extruded tubing at respective stations therealong at which severing is desired, effecting said substantial drying of the extruded tubing, and applying bending stress upon the dried tubing at said scored stations thereby breaking the tubing proximate the scored stations into separate lengths.

19. In the extrusion of moist elongated ceramic tubing and the subsequent substantial drying of same to rigid brittleness, an improved method for producing and severing ceramic tubes of exact length and exact dimensional tolerances which comprises the steps of forming the moist extrudable ceramic material rigid enough to hold its shape when extruded yet plastic enough to flow slightly into depressions when extruded, continuously extruding ceramic tubing from said material in a generally horizontal plane, circumferentially scoring the surface of the extruded tubing at respective stations therealong at which severance is desired, receiving and conveying said extruded tubing upon a conveyor belt means traveling in the extrusion plane of the bottom of the periphery of that tubing and in the extrusion direction and substantially at the extrusion speed, effecting said substantial drying of the extruded tubing while being conveyed upon said conveyor belt means, and applying bending stress upon the dried tubing at said scored stations thereby breaking the tubing proximate the scored stations into separate lengths.

20. The method of claim 17 wherein said ceramic material is a beryllia-base ceramic material.

21. Method of claim 17 wherein said ceramic material comprises a preponderant portion of comminuted beryllia and a minor proportion of carbonaceous binder.

22. Method of claim 17 wherein said ceramic material consists of substantially 70 percent by weight beryllia powder of 0.001 to 1 micron particle size and substantially 30 percent by weight of a binder-plasticizer wherein the binder plasticizer consists of 2 parts by weight of a binder consisting of polyvinyl pyrrolidone, polyvinyl acetate, and an emulsifier, and 3 parts by weight of a plasticizer consisting of 1 part by weight glycerine and 3 parts by weight water.

23. Method of claim 17 herein said ceramic material consists of substantially 70 percent of mixed, comminuted beryllia and urania, the urania content of which is less than 10 percent by weight that of said beryllia and substantially 30 percent by weight of a binder-plasticizer wherein the binder plasticizer consists of 2 parts by weight of a binder consisting of polyvinyl pyrrolidone, polyvinyl acetate, and an emulsifier, and 3 parts by weight of a plasticizer consisting of 1 part by weight glycerine 3 parts by weight water.

* * * * *